United States Patent [19]

Shibano et al.

[11] Patent Number: 4,833,481
[45] Date of Patent: May 23, 1989

[54] ROADSIDE BEACON SYSTEM

[75] Inventors: Yoshizo Shibano; Haruo Suzuki; Tohru Iwai, all of Osaka, Japan

[73] Assignee: Sumitomo Electric Industries, Ltd., Osaka, Japan

[21] Appl. No.: 75,904

[22] Filed: Jul. 20, 1987

[30] Foreign Application Priority Data

Jul. 19, 1986 [JP] Japan ............................... 61-170172
Oct. 2, 1986 [JP] Japan ............................... 61-234907
Oct. 2, 1986 [JP] Japan ............................... 61-234908

[51] Int. Cl.$^4$ ............................................. G01S 3/02
[52] U.S. Cl. .................................... 342/457; 340/902; 455/17
[58] Field of Search ....................... 342/457; 340/902; 455/17

[56] References Cited

U.S. PATENT DOCUMENTS 3,351,941 11/1967 Page .
4,017,825 4/1977 Pichey ................................ 340/906
4,443,790 4/1984 Bishop ................................ 340/902

Primary Examiner—Theodore M. Blum
Attorney, Agent, or Firm—Sughrue, Mion, Zinn, Macpeak & Seas

[57] ABSTRACT

A roadside antenna system permitting the transmission of data to a vehicular navigation system and providing for the recalibration of positional data carried by the navigation system includes an antenna structure and transmitter system which permits the data transmission signal to be broadcast in a wide pattern. Meanwhile, the signal that provides for positional recalibration is broadcast in a high directivity signal or split beam. The positional accuracy of the navigator system is improved by performing the positional calibration only when intercepting the narrow beam pattern. Data transmission and reception can be carried out within a larger effective reception area without affecting the positional accuracy.

18 Claims, 10 Drawing Sheets

ROADSIDE BEACON SYSTEM

BACKGROUND OF THE INVENTION

This invention relates to roadside beacon systems and, more particularly, to a novel roadside beacon system used for vehicle position calibration in a navigational system. After data on a departure point has been received, at least vehicle speed data and direction data are inputted to display the present position of the vehicle.

A so-called "navigational system" for automotive use has been proposed in the art, and details of such types of systems may be found in commonly assigned copending applications Ser. Nos. 026,403, 3-16-87; 026,359, 3-16-87, and Ser. No. 63383, filed 6/18/87. In such a navigational system, a small computer and a display unit are installed on a vehicle, road map data is read out of a memory comprising a compact disk or the like and displayed on the display unit, and vehicle speed data and direction data are received respectively from a vehicle speed sensor and a direction sensor so that the position of the vehicle may be calculated while the traveling direction thereof is determined. According to the results of this calculation and directional determination, a mark representing the vehicle is indicated on the road map displayed on the display unit to show the present position and traveling direction of the vehicle.

In this navigation system, the present position and traveling direction of the vehicle can be visually detected with ease, and therefore the vehicle driver can positively reach his or her destination without becoming lost.

However, this navigational system suffers from the following difficulties: Errors inherent in the vehicle speed sensor and the direction sensor are accumulated as the vehicle's traveling distance increases. That is, when the vehicle travels for a certain distance an accumulated error develops, the size of which depends on the degree of the errors of the vehicle speed sensor and the direction sensor, and variations in the environmental conditions of these sensors. The rate of error accumulation is not necessarily constant. Over time, the vehicle position displayed on the display unit is greatly deviated from the true vehicle position, so that the navigation system cannot perform its intrinsic function and the driver may lose his or her way.

In order to eliminate the above-described difficulty, a so-called "roadside beacon system" has been proposed in the art. In the roadside beacon system, roadside antennas are installed at certain distance intervals in a road traffic network which intervals are shorter than a distance for which errors accumulate to predetermined threshold values. A signal including position data and road direction data is radiated over a relatively small area from each of the roadside antennas thus installed, and the signal thus radiated is received by an antenna installed on the vehicle and inputted to the system computer, so that the position and traveling direction of the vehicle may be corrected according to the signal thus received.

When the roadside beacon system is employed, the display function can be performed with accurate position data and direction data with the accumulated errors can be held under predetermined threshold values at all times, and therefore the navigation system can perform its function correctly. Moreover, if the roadside antennas are installed at positions such as near railroads and railroad crossings where the on-board direction sensor is liable to be adversely affected in operation, then errors attributed to external factors can also be effectively corrected, advantageously.

In the above-described roadside beacon system, each of the roadside antennas is considerably high in directivity and radiates the signal including the position data and the road direction data at all times, and the vehicle receives the signal thus radiated only when passing through the area covered by the signal. If the area covered by the signal is increased, then the signal reception position with respect to the roadside antenna is greatly shifted, with the result that system correction or calibration is inaccurately performed.

This difficulty will be described in more detail. The fundamental function of the roadside beam system is to transmit a signal including position data and road direction data to vehicles having the navigation system. However, in order to effectively utilize the roadside beacon system, the following functions are also essential:

(1) Traffic data such as traffic congestion, road construction and the use of the roads around the roadside antenna are additionally provided to the navigation system so that the vehicle can travel smoothly.

(2) Detailed map data including the arrangement of houses near the roadside antenna are given so that the vehicle can readily reach its destination.

(3) Wide range road map data are transmitted to the navigation system to renew or supplement the road map displayed on the display unit, so that the vehicle can travel to far destinations.

In order to enable the roadside beacon system to perform these functions, it is necessary to increase the transmission band of the signal radiated from the roadside antenna and/or to increase the area covered by the signal.

However, if the transmission band of the signal and the area covered by the signal are increased as has been described above, the signal reception position with respect to the position of the roadside antenna is greatly shifted, as a result of which the calibration of the vehicle position, which is the original purpose of the system is not correctly carried out.

As the vehicle passes each roadside antenna, the positional relationships between the vehicle and buildings and other vehicles near the roadside antenna change with time. Therefore, as shown in FIG. 19, the signal radiated by the roadside antenna is received directly by the mobile antenna, and it is also received thereby after being reflected by the building, the road or another vehicle. These signals reaching the mobile antenna along different paths are different from one another in amplitude and in phase and are superposed in a cumulative or differential manner. Thus, the resultant signal is much different in signal strength distribution from the original signal transmitted by the roadside antenna as shown in FIG. 11 (i.e., a fading phenomenon attributable to the multi-path transmission occurs). Therefore, an error is caused when the vehicle position is calibrated according to the signal received. That is, as the resultant signal mentioned above provides a high level at a position far away from the roadside antenna, the position and traveling direction of the vehicle are undesirably calibrated when the high level is detected.

This difficulty may be overcome by a method in which a low-pass filter is used to eliminate the effect of the fading phenomenon on the signal strength distribution described above.

In general, however, the variation in signal strength due to the fading phenomenon occurs cyclically in a range from 10 Hz to 100 Hz. Therefore, the low-pass filter should have a cut-off frequency of several hertz (Hz). In order for a passive circuit to form a low-pass filter of such low cut-off frequency, it is necessary to use large inductive elements and large capacitive elements, which makes it difficult to miniaturize the device which is to be installed on the vehicle. If an active filter is used, the device can be miniaturized; however, the number of components is increased, the circuitry becomes intricate, and the manufacturing cost of the device is increased.

In order to overcome the above-described problem, there has been proposed a roadside beacon system wherein a signal modulated according to transmission data is radiated in the form of a split beam in order to enlarge the area, where the electric field strength is higher than a predetermined level, covered for data transmission; the electric field strength being abruptly lowered at a position directly confronting each roadside antenna. The transmission of necessary data is effected within the area where the electric field strength is higher than the predetermined level; and position calibration is effected by detecting a state wherein the electric field strength abruptly decreases.

This roadside beacon system enables enlargement of the area which is covered for data transmission but suffers from the problem that, since the electric field strength abruptly lowers at the position which directly confronts the roadside antenna, transmission of data cannot be effected in the state wherein it is possible to perform position calibration.

SUMMARY AND OBJECTS OF THE INVENTION

In view of the above-described problems, it is an object of this invention to provide a roadside beacon system which s capable of readily coping with the need for expanding various functions of the system and which accurately effects calibration of data concerning the position of the vehicle without suspending the data transmission.

To this end, the present invention provides a roadside beacon system wherein a roadside device transmits from a roadside antenna a first signal modulated with a constant amplitude according to transmission data and a second signal amplitude-modulated with a predetermined frequency, and wherein a navigator device which is loaded on the vehicle to receive the transmission signals from the roadside antenna to calibrate the display vehicle position data detects the second signal to perform a position decision and calibrates at least the position data according to a position decision signal and data received via the first signal.

The arrangement may be such that a carrier wave of a predetermined frequency is divided into two parts, one of which is subjected to modulation with a constant amplitude according to transmission data and is then transmitted from the roadside antenna, and the other of which is subjected to amplitude modulation with a predetermined frequency and is then transmitted from the roadside antenna. The arrangement may also be such that a carrier wave of a predetermined frequency is subjected to modulation with a constant amplitude according to transmission data, and this modulated signal is divided into two parts, one of which is transmitted as it is, and the other of which is subjected to amplitude modulation with a predetermined frequency and is then transmitted. In any case, the two modulated signals may be transmitted from respective antennas or may be transmitted from a common antenna. Further, the signal which has been subjected to amplitude modulation may be transmitted from the roadside antenna with sharp directivity or may be transmitted from the roadside antenna in the form of a split beam.

Further, it is preferable that the signal which has been subjected to amplitude modulation is transmitted from the roadside antenna in such a manner that this signal has weaker electric field strength than that of the signal which has been modulated with a constant amplitude.

With the above-described roadside beacon system, when a variety of data including at least position data is transmitted to a vehicle from a roadside antenna installed at a predetermined position in a road traffic network, the roadside device transmits from the roadside antenna a first signal modulated with a constant amplitude according to transmission data and a second signal amplitude-modulated with a predetermined frequency, while the navigator device which is loaded on the vehicle to receive the transmission signals from the roadside antenna to calibrate and display vehicle position data detects the second signal to perform a position decision and calibrates at least the position data according to a position decision signal and data received via the first signal, thus enabling navigation to be effected thereafter on the basis of the calibrated data.

In the case where a carrier wave signal of a predetermined frequency is divided into two parts, one of which is subjected to modulation with a constant amplitude according to transmission data and is then transmitted from the roadside antenna, and the other of which is subjected to amplitude modulation with a predetermined frequency and is then transmitted from the roadside antenna, or in the case where a carrier wave signal of a predetermined frequency is subjected to modulation with a constant amplitude according to transmission data, and this modulated signal is divided into two parts, one of which is transmitted as it is, and the other of which is subjected to amplitude modulation with a predetermined frequency and is then transmitted, it is also possible to effect data transmission on the basis of the signal which has not been subjected to amplitude modulation and to perform position decision on the basis of the signal which has been subjected to amplitude modulation.

In the case where the two signals are transmitted from respective antennas or are transmitted from a common antenna, it is possible to effect data transmission and position decision in a similar manner.

In the case where the signal which has been subjected to amplitude modulation is transmitted from the roadside antenna with sharp directivity, it is possible to perform the position decision with high accuracy by demodulating the signal subjected to amplitude modulation and detecting the state wherein a predetermined level is exceeded.

In the case where the signal which has been subjected to amplitude modulation is transmitted from the roadside antenna in the form of a split beam, it is possible to perform the position decision with high accuracy by demodulating the signal subjected to amplitude modulation and detecting the state where the level is abruptly lowered.

In the case where the signal which has been subjected to amplitude modulation is transmitted from the roadside antenna in such a manner that this signal has a weaker electric field strength than that of the signal which has been modulated with a constant amplitude, it is possible to reduce the rate at which the signal subjected to amplitude modulation is affected by the other signal, which enables accurate data transmission.

BRIEF DESCRIPTION OF THE DRAWINGS

[FIG. 8(a) is a perspective view, while FIG. 8(b) is a plan view];

DETAILED DESCRIPTION OF THE PREFERRED EMBODIMENT

Preferred embodiments of this invention will be described hereinunder in detail with reference to the accompanying drawings.

Figure 20:
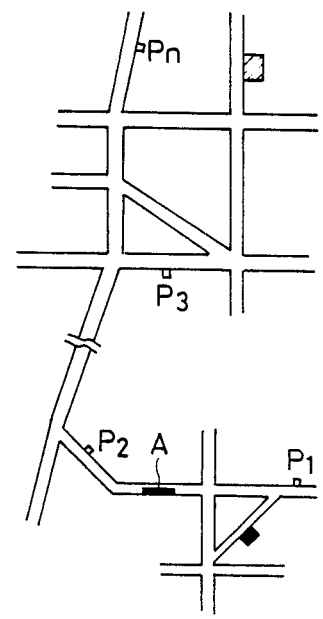
FIG. 20 is a diagram schematically showing one example of a road map displayed on a display unit.

FIG. 20 is a diagram showing one example of a road map which is displayed on a display unit. In the diagram, the present position and traveling direction of a vehicle are indicated by the arrow A, and roadside antennas P1, P2, ... Pn are displayed where they are actually installed (the display of the roadside antennas, P1, P2, ... Pn is not always necessary for navigation of the vehicle). In addition, for instance, buildings are displayed as guides for the vehicle driver.

Figure 18:
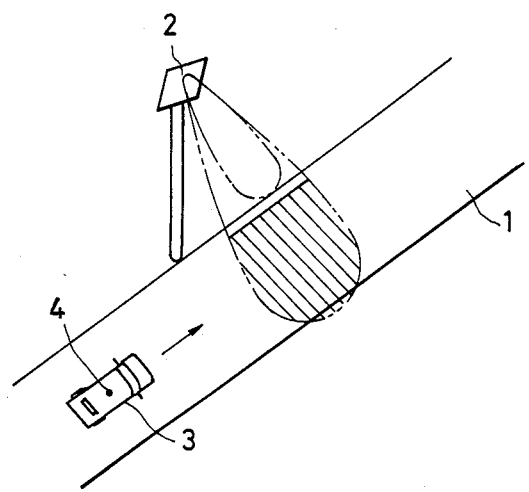
FIG. 18 is a perspective view outlining the roadside beacon system.
Figure 19:
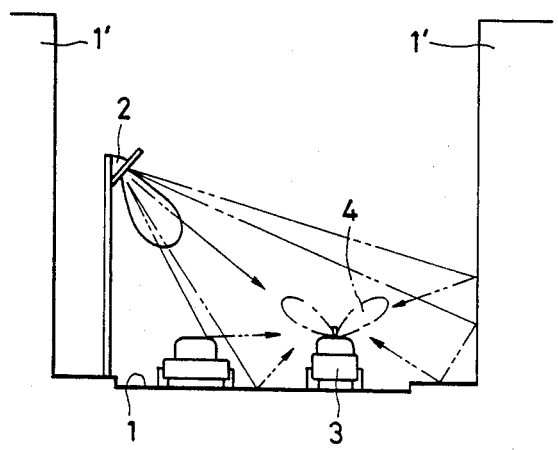
FIG. 19 is a schematic view for description of a multipath fading phenomenon.

FIGS. 18 and 19 are schematic views illustrating a roadside beacon system. As shown in these figures, a roadside antenna 2 for transmitting a signal including position data and road direction is installed near road 1 at a predetermined position, and a mobile antenna 4 for receiving the signal is installed at a predetermined position on a vehicle 3 traveling along the road 1. The signal received through the antenna 4 is supplied to a navigation device (not shown).

The signal transmtited through the roadside antenna 2 reaches the mobile antenna 4 after being reflected one or more times by buildings 1', the road surface, other vehicles, etc. These signals are superposed on one another in a cumulative mode or in a differential mode, and therefore the resultant signal, i.e., the signal received, is much different in signal strength distribution from the signal transmitted (see FIG. 11).

Figure 1:
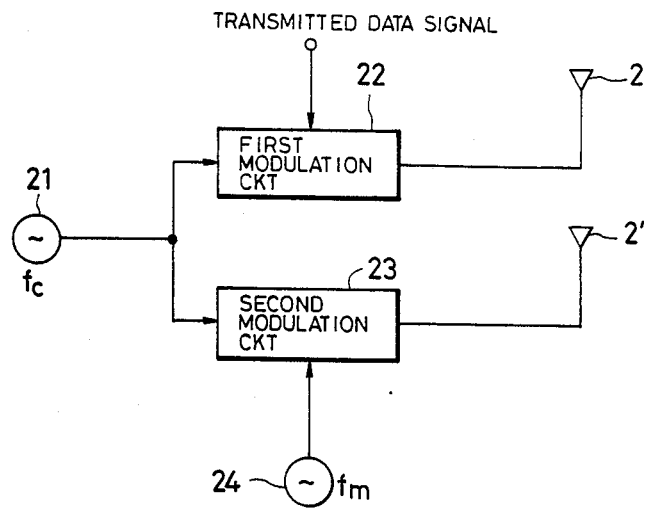
FIG. 1 is a block diagram showing one example of a roadside device which may be employed in the roadside beacon system according to this invention.
Figure 2:
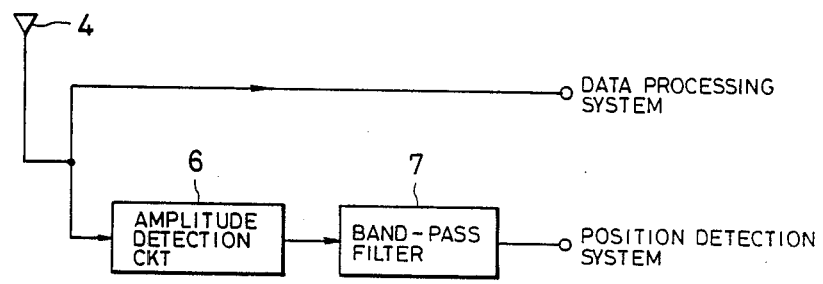
FIG. 2 is a block diagram showing one example of a mobile device which may be employed in the roadside beacon system according to this invention.

FIGS. 1 and 2 are block diagrams showing one embodiment of a roadside beacon system according to this invention. More specifically, FIG. 1 is a block diagram showing a signal transmitting device, namely, a roadside device, and FIG. 2 is a block diagram showing a signal receiving device, namely, a mobile device.

The roadside device is arranged such that an oscillation signal (of a frequency $f_c$) outputted from a carrier oscillator 21 is divided into two parts, one of which is supplied to a first modulation circuit 22, where it is subjected to modulation with a constant amplitude (PSK modulation, FSK modulation, etc.), and the other of which is supplied to a second modulation circuit 23, where it is subjected to amplitude modulation. The first modulation circuit 22 is further supplied with a data signal which is to be transmitted as a modulating signal, while the second modulation circuit 23 is further supplied with an oscillation signal (of a frequency $f_m$) as a modulating signal from a modulating wave oscillator 24. The signals which are output from the above-described modulation circuits are supplied to an antenna 2 for data and to an antenna 2' for the positioniong signals, respectively. The antenna 2 has directivity by which a signal can be radiated over a considerably wide area with an electric field strength higher than a predetermined level, while the antenna 2' has directivity by which a signal can be radiated only over an exceedingly narrow range with an electric field strength higher than a predetermined level.

Figure 3:
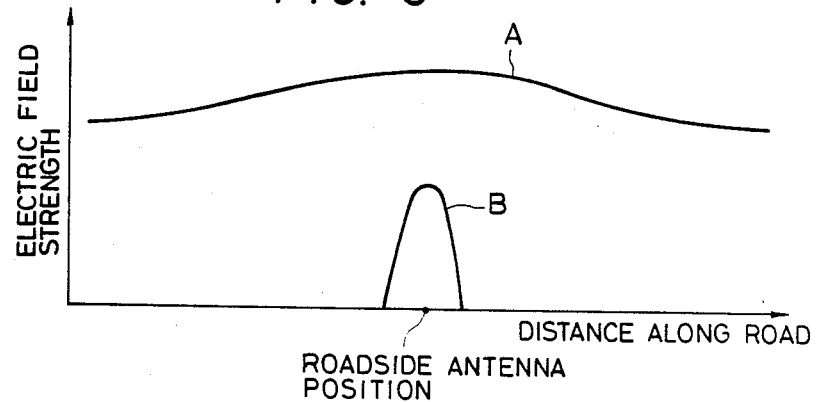
FIG. 3 is a diagram showing the electric field strength distribution of signals along a road.

Accordingly, it is possible to radiate from the antenna 2 a wave of strong electric field strength over a considerably wide area as shown by A in FIG. 3, while it is possible to radiate from the antenna 2' a wave of strong electric field strength only over an exceedingly narrow area as shown by B in FIG. 3. More specifically, it is possible to reliably prevent suspension of the data transmission at a position which directly confronts the roadside antenna, and it is also possible to radiate a signal enabling a highly accurate positional decision. The wave radiated from the antenna 2 has been subjected to modulation with a constant amplitude; therefore, if the wave radiated from the antenna 2' is set at a relatively low level (e.g., at a level about 15 dB lower than the wave radiated from the antenna 2, it is possible to prevent the generation of errors in the transmission of data. Further, since the wave used for the position decision is localized only at the position which directly confronts the roadside antenna, it is possible to reliably prevent the effect of multi-path fading.

The mobile device is arranged such that the signal received by a mobile antenna 4 is divided into two parts, one of which is supplied to a data processing system as it is, and the other of which is supplied to a position decision system through an amplitude detection circuit 6 and a band-pass filter 7 whose central frequency is $f_m$.

Accordingly, the waves radiated from the antennas 2 and 2' are received by the mobile antenna 4 and then divided into two parts, one of which is directly supplied to the data processing system to be subjected to processing such as demodulation to thereby obtain the original data, and the other of which is amplitude-detected in the amplitude detection circuit 6 and then supplied to the band-pass filter 7 to extract only a component of frequency $f_m$, which is then supplied to the position decision system where it is subjected to processing such as demodulation and level detection to produce a position decision signal. With the position decision signal used as a timing signal, a calibrating operation is conducted on the basis of the data obtained as described above.

Figure 4:
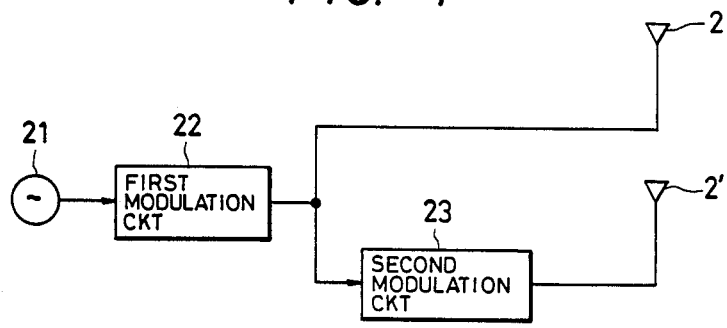
FIG. 4 is a block diagram showing another example of the roadside device.

FIG. 4 is a block diagram showing a roadside device in accordance with another embodiment, in which an oscillation signal outputted from a carrier oscillator 21 is supplied to a first modulation circuit 22 to obtain an output signal which has been modulated with a constant amplitude according to the data to be transmitted, and this signal is divided into two parts, one of which is supplied to the antenna 2 as it is, and the other of which is supplied to a second modulation circuit 23 to obtain an output signal which has been subjected to amplitude modulation, the output signal being supplied to the antenna 2'.

In the case of this embodiment also, it is possible to radiate waves of electric field strengths shown in FIG. 3, and a calibrating operation similar to that in the above-described embodiment can be conducted in the mobile device which receives the transmitted wave.

Figure 5:
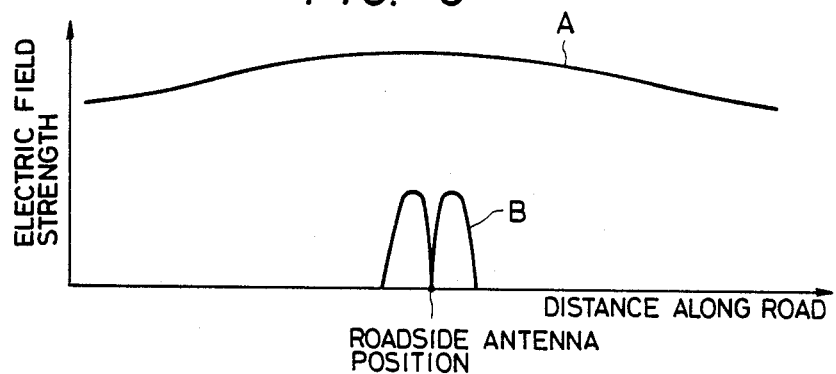
FIG. 5 is a diagram showing the electric field strength distribution of signals, along a road, obtained by the embodiment illustrated in FIG. 4.

FIG. 5 shows the electric field strength distribution in accordance with still another embodiment. This embodiment is different from the embodiment shown in FIG. 3 only in that the wave which has been subjected to amplitude modulation is radiated in the form of a split beam.

Accordingly, in the case of this embodiment, it is possible to effect a highly accurate positional calibration on the basis of the detection of a sudden lowering in field strength of the wave subjected to amplitude modulation.

Figure 6:
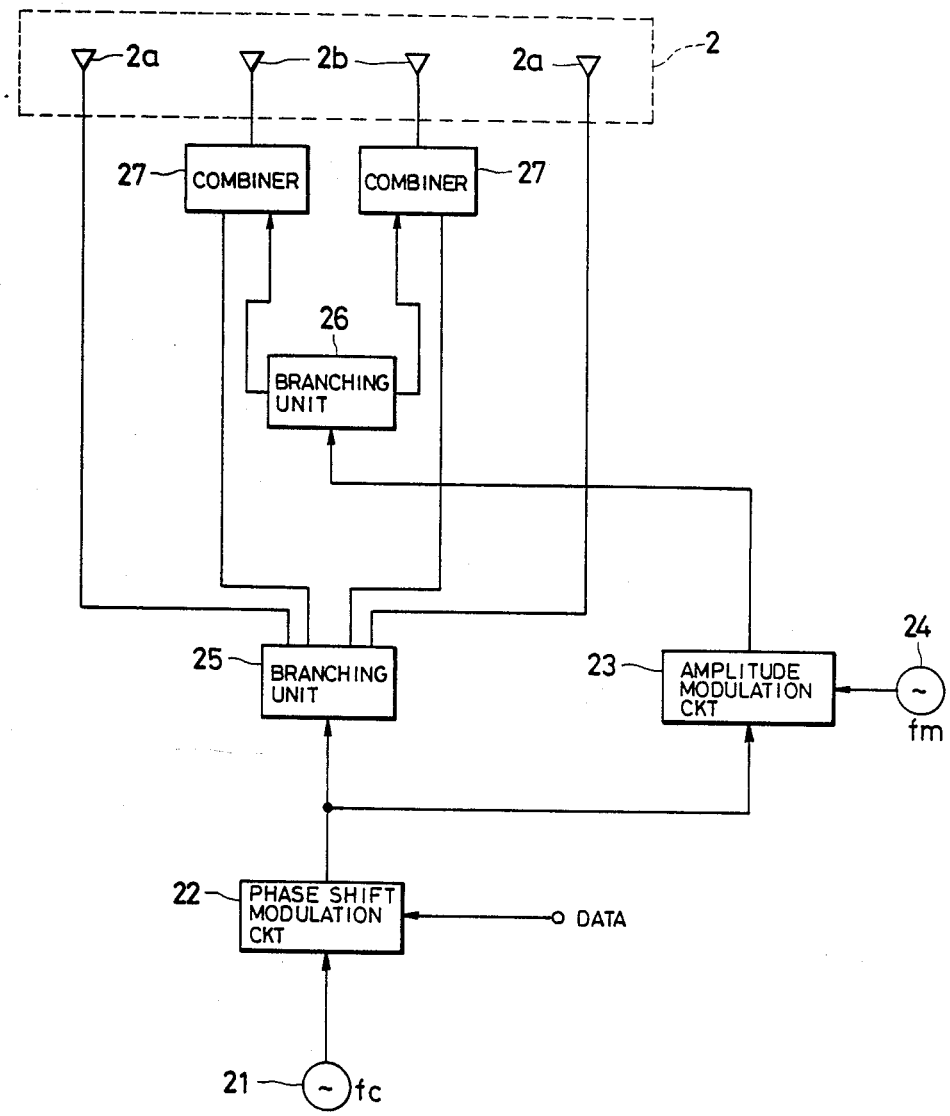
FIG. 6 is a block diagram showing more detail of the embodiment illustrated in FIG. 2.

Referring to FIG. 6, which is a block diagram showing the embodiment illustrated in FIG. 4 in more detail, an oscillation signal (of a frequency $f_c$) outputted from a carrier oscillator 21 is applied to a phase shift modulation circuit 22 to which a data signal to be transmitted is also supplied as a modulating signal. As a result, the modulation circuit 22 provides a modulation output signal of constant amplitude. The modulation output signal is applied through a branching unit 25 to antenna units 2a and 2b of a roadside antenna 2, with a predetermined phase difference. The output signal of the phase shift modulation circuit 22 is further applied to an amplitude modulation circuit 23 to which a modulating wave oscillator 24 supplies an oscillation signal as a modulating signal (the oscillation signal has a frequency $f_m$ which is much higher than the frequency $f_F$ of the amplitude variation which is caused by fading; for instance, in the case where the maximum speed of the vehicle 3 is 200 km/h, and the carrier frequency $f_O$ of the beacon wave is 1.5 GHz, i.e., the wavelength $\lambda_O=200$ mm, $f_F$ is 278 Hz, and it can be considered that the maximum frequency of the amplitude variation caused by fading is several hundreds of hertz. Therefore, it is preferable to set the frequency $f_m$ in a range from several kilo-hertz to several hundred kilo-hertz). As a result, the amplitude modulation circuit 23 provides a modulation output signal subjected to amplitude modulation. The modulation output signal is applied through a branching unit 26 to combining units 27, where it is superposed on the signal which has been subjected to the phase-shift modulation only. The output signals of the combining units 27 are applied only to the two antenna units 2b located at the middle of the roadside antenna 2. It should be noted that the amplitude-modulated signal applied to one of the two antenna units 2b is opposite in phase to that applied to the other. This will be described in more detail. The electric field strength distribution along the road may vary, at worst, with a period of $\lambda_O/2$ due to fading (where $\lambda_O$ is the wavelength of the carrier modulated with the transmission data signal). Therefore, the signal received by the mobile antenna may vary with a period $T=\lambda_O/2V$ (where V is the speed of the vehicle). Accordingly, the amplitude modulation may take place with a frequency $f_F=1/T=2V/\lambda_O$. Thus, the frequency for the amplitude modulation should be set to a value much higher than the frequency $f_F$ above-mentioned.

Under this set of conditions, the signal received by the mobile antenna can be represented by the following equation:

$$V=A\ (x(t))\ (1+m(I\ x)\cos(2\pi f_m t)\ +m_F\cos(2\pi f_F t))\times \cos\ (2\pi f_c t+\theta s(t))$$

(where x is the distance measured along the road, A(x) is a function proportional to the electric field strength distribution along the road, m(x) is the amplitude modulation index with the frequency $f_m$, $m_F$ is the amplitude modulation index due to fading, $\theta s(t)$ is the phase function representing the transmission signal, and $fF_c$ is the frequency of the carrier). Therefore, if the signal is subjected to amplitude detection to extract amplitude components only therefrom, then $$V=A(x(t))\ (1+m(x)\cos(2\pi f_m t)+m_F\cos(2\pi f_F t))$$

This equation still contains components attributable to fading. However, if this amplitude-detected signal is applied to a band-pass filter having a central frequency $f_m$ to extract the component of the frequency $f_m$, then, since A(x(t)) and m(x(t)) are moderate in their variation with time, a signal which is represented as follows is extracted:

$$V_m=m(x(t))A(x(t))\cos(2\pi f_m t)$$

Therefore, when this signal is subjected further to amplitude detection, the following signal is obtained:

$$V_m=m(x(t))A(x(t))$$

that is, the resultant signal is proportional to the electric field strength distribution of the component amplitude-modulated with the frequency $f_m$.

When the ratio a of the electric field strength of the signal amplitude-modulated and that of the signal not amplitude-modulated satisfies the following condition, the signal can be accurately demodulated to obtain the data:

$$a < 1/(1+m)$$

(where m is the modulation index of the second modulation means).

It should be noted that the phase shift modulation circuit 22 may be replaced with a frequency shift modulation circuit; that is, it may be replaced with a circuit which can provide a modulation output signal having a constant amplitude.

FIG. 8 shows the construction of a roadside antenna 2.

Figure 8A:
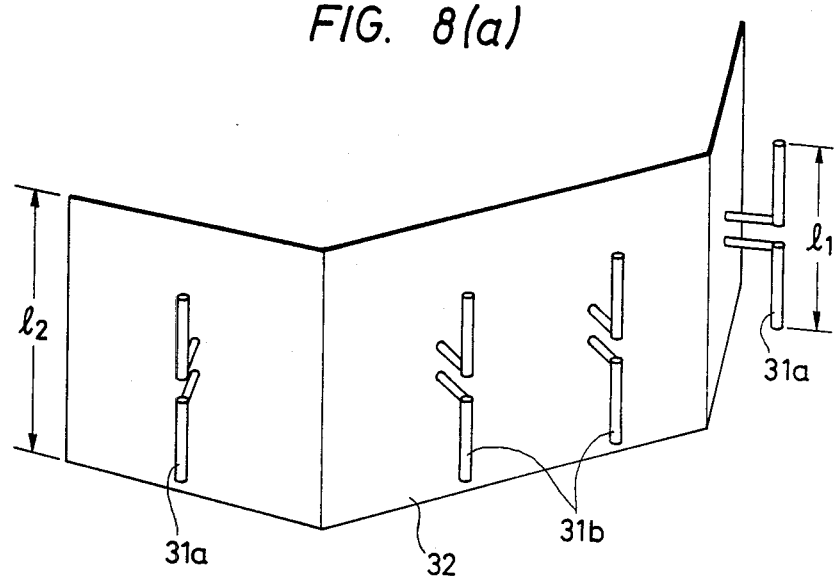
FIGS. 8(a) and 8(b) show one example of a roadside antenna employed in the roadside beacon system of this invention
Figure 8B:
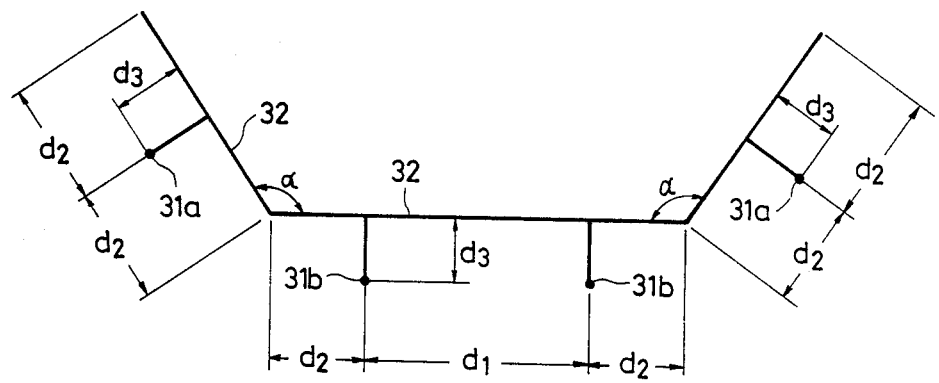

FIG. 8(a) is a prospective view of the roadside antenna 2, which is made up of four antenna units which are defined by dipole antennas with plane reflector, respectively. FIG. 8(b) is a plan view of the roadside antenna 2, in which the reference characters 31a and 31b denote dipole antennas, and 32 a plane reflector. In FIG. 8, the relative dimensions of the roadside antenna are as listed below (being normalized according to the wavelength of the radio wave to be transmitted):

$l1 = 1$
$l2 = 2$
$d_1 = 1$
$d_2 = \frac{1}{2}$
$d_3 = \frac{1}{4}$
$a = 120°$

Figure 9A:
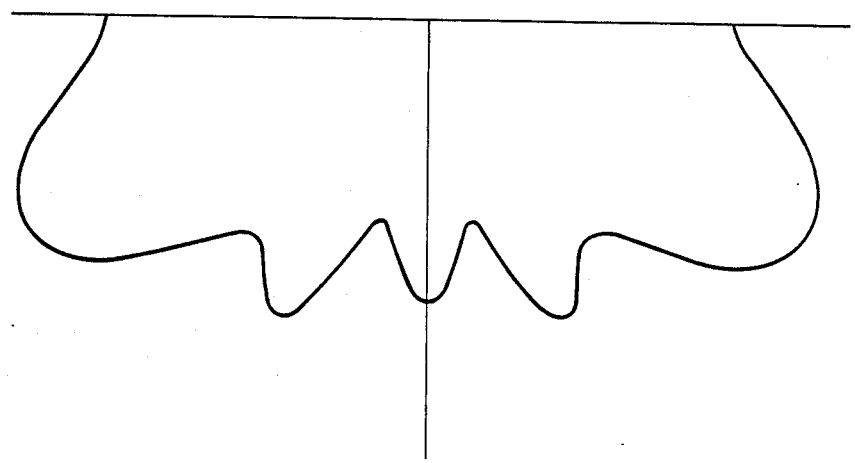
FIGS. 9(a) and 9(b) are diagrams showing calculated values for a radiation pattern of the roadside antenna shown in FIGS. 8(a) and 8(b)
Figure 9B:
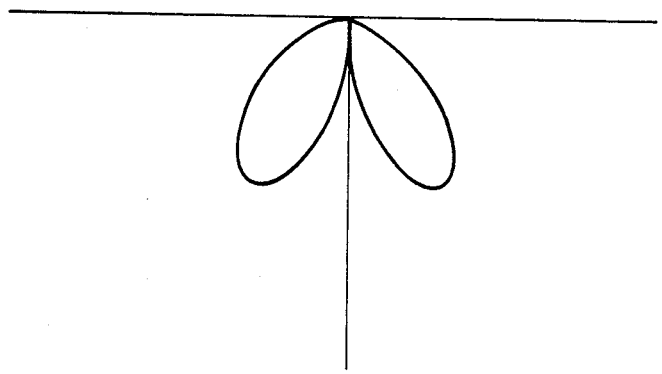
Figure 10:
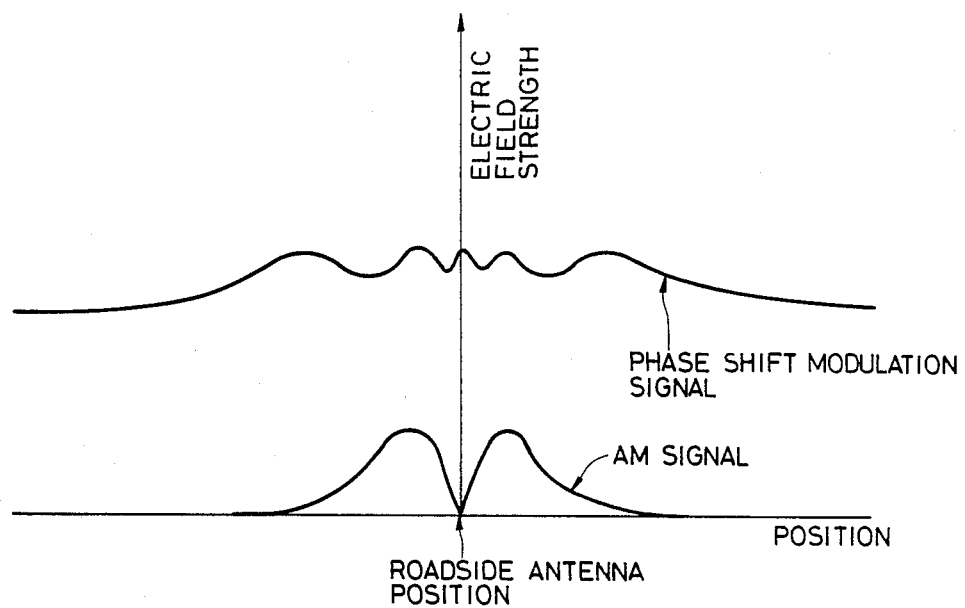
FIG. 10 is a graph showing the electric field strength distribution of signals along a road.

The roadside antenna 2 exhibits horizontal directivity patterns as illustrated in FIG. 9. FIG. 9(a) shows the directivity pattern of the roadside antenna which is provided when the dipole antennas 31b are fed at a level lower by 10 dB than the dipole antennas 31a. The directivity pattern corresponds to the radiation pattern of the signal which is modulated by the phase shift modulation circuit 22 with the amplitude held constant. FIG. 9(b) shows the directivity pattern provided when only the dipole antennas 31b are fed in opposite phase, thus corresponding to the radiation pattern of the output signal of the amplitude modulation circuit 23. The electric field strength distributions, along the road, of the above-described two signals are as indicated in FIG. 10.

Figure 7:
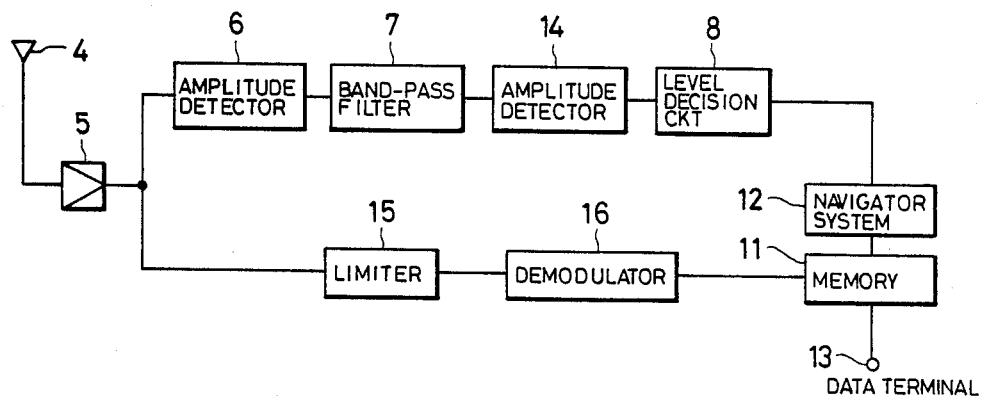
FIG. 7 is a block diagram showing more detail of the mobile device.

Referring to FIG. 7, which is a block diagram showing the embodiment illustrated in FIG. 2 in more detail, the signal (see FIG. 11) received by the mobile antenna 4 is amplified by an amplifier 5, the output of which is applied to a first amplitude detection circuit 6 and a limiter circuit 15. As a result, the first amplitude detection circuit 6 provides a detection output signal, which is applied to a band-pass filter 7 whose central frequency is $f_m$. Therefore, only the component of frequency $f_m$ is supplied to a second amplitude detection circuit 14, as a result of which an amplitude modulation signal, from which the amplitude variation attributable to fading has been eliminated, is obtained (see FIG. 10).

The detection output signal of the second amplitude detection circuit 14 is applied to a level decision circuit 8.

The output signal (see FIG. 11) of the amplifier 5 is further applied to the limiter circuit 15 adapted to eliminate an amplitude variation component, as has been described above. As a result, the limiter circuit 15 provides a modulation signal having a predetermined amplitude, which is applied to a demodulation circuit 16, so that the transmitted data is reproduced. The data thus obtained is temporarily stored in a memory 11, and necessary data is read therefrom by a device (not shown) connected to a communication data terminal 13. On the other hand, data necessary for navigation, such as road direction data and map data, are stored in a navigator 12. When the aforementioned level decision circuit 8 outputs a position decision signal (or timing pulse signal), present position data is stored in the navigator 12 for calibration of the present position.

The operation of the roadside beacon system thus organized will be described in detail with reference to FIGS. 10 to 12.

The signal transmitted through the roadside antenna 2 is the sum of the signal obtained by subjecting a carrier having a frequency $f_0$ to phase shift modulation or frequency shift modulation according to the transmission data, and the signal obtained by subjecting that signal to amplitude modulation with a frequency much higher than the frequency of the amplitude variation which is caused by fading.

Therefore, the signal (see FIG. 11) received by the mobile antenna 4 is equivalent to a signal which is obtained by amplitude-modulating the transmitted signal with a relatively low frequency signal attributable to fading.

The signal thus received is applied to the first amplitude detection circuit 6 and the limiter circuit 15 as it is, that is, as affected by fading. The output signal of the first amplitude detection circuit 6 is applied through the band-pass filter 7 to the second amplitude detection circuit 14, where it is converted into a signal proportional to an amplitude modulated wave signal field strength distribution function (see FIG. 12), which is applied to the level decision circuit 8.

In the case where the vehicle 3 traveling along the road 1 passes the roadside antenna 2 (i.e., moves toward the roadside antenna and then moves away from it), for the initial period of time the signal reception level of the mobile antenna 4 is held substantially at zero. As the vehicle approaches the roadside antenna 2, the signal reception level is gradually increased, and when the level is increased to the degree that the data can be read by the demodulation circuit 16, the data is stored in the memory 11. Under this condition, no data is delivered through the memory 11 to the navigator 12. That is, the navigator 12 determines the present position and traveling direction of the vehicle according to vehicle speed data from a vehicle speed sensor (not shown) and traveling direction data from a direction sensor (not shown), so that the present position and traveling direction together with the road map are displayed on a display unit (not shown).

When the vehicle 3 traveling along the road comes to the position where it approaches a position directly in front of the roadside antenna 2, the level of the signal proportional to the amplitude modulated wave signal field strength distribution function is further increases, so that the level of the signal supplied to the level decision circuit 8 exceeds the reference level L. As a result, the latter applies a position decision signal to the navigator 12, so that the position data in the memory 11 becomes ready for transfer. When the vehicle 3 reaches the position where it directly confronts the roadside antenna 2, the level of the signal proportional to the amplitude modulated wave field strength distribution function falls to zero abruptly and rises to the previous level immediately. At this time instant, the position data is transferred from the memory 11 into the navigator 12, where the present position stored therein is calibrated, so that the position data and the traveling direction data are calibrated, and the correct present position and traveling direction are displayed on the display unit.

Thereafter, with the position and traveling direction thus calibrated as reference data and according to vehicle data outputted from the vehicle speed sensor and traveling direction data outputted from the direction sensor, the position and traveling direction of the vehicle 3, together with the road map, can be accurately displayed in the form of the arrow A on the display unit.

Figure 11:
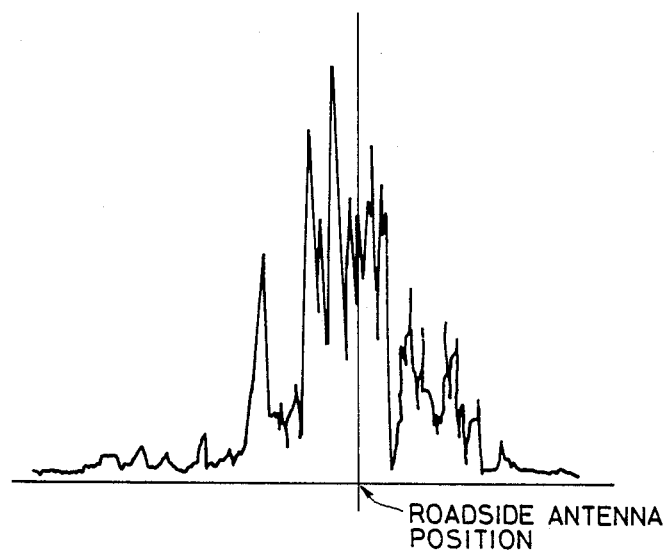
FIG. 11 is a graph showing the variations in level of a signal received by a mobile antenna.
Figure 12:
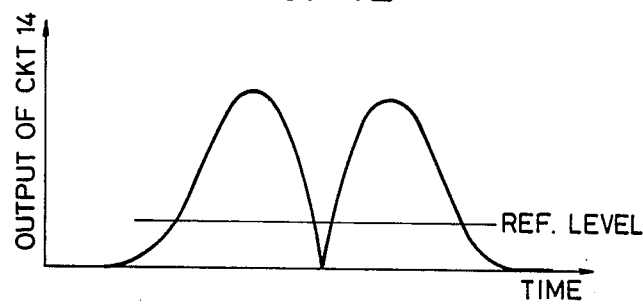
FIG. 12 is a diagram showing the relationship between the level of an amplitude modulated wave signal from which the effect of fading has been eliminated, and a threshold level.

It should be noted that FIGS. 10 to 12 show the variations in level of the signal received by a vehicle 3 which is traveling at a constant speed. When the speed of the vehicle 3 is changed, only the period of preparation for positional data transfer is changed, which will cause no problem in operation.

Figure 13:
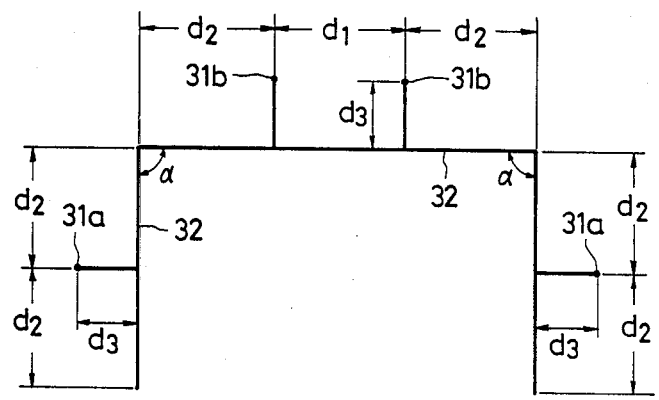
FIG. 13 is a schematic view showing another example of the roadside antenna.

FIG. 13 schematically shows another example of the roadside antenna 2. The roadside antenna 2 of FIG. 13 is different from that of FIG. 8 only in the following points:

First, in the relative dimensions,
$d_1 = \frac{1}{2}$
$a = 90°$

Figure 14:
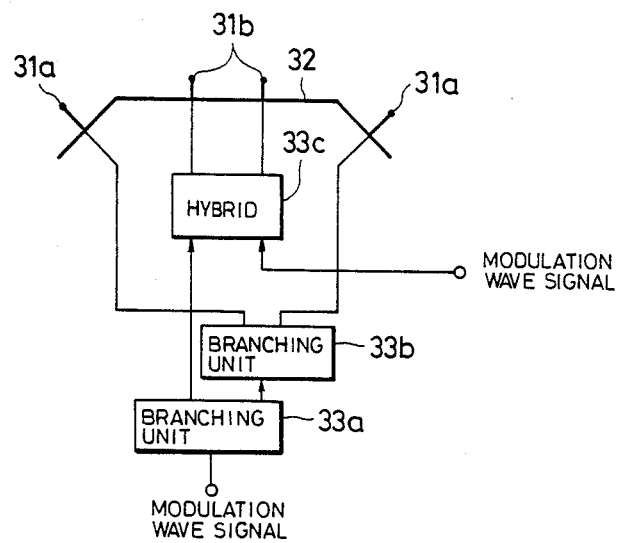
FIG. 14 is a diagram for a description of a hybrid circuit.

Secondly, the signal of constant amplitude is divided into two parts by a branching unit 32a. One of the two parts is further divided into two parts by a branching unit 33b which further divided parts are applied to the dipole antennas 31a, while the other is supplied to one of the input terminals of a hybrid circuit 33c. The other terminal of the circuit 33c receives a wave subjected to amplitude modulation and the composite waves thereof are applied through output terminals to the dipole antennas 31i b. In this connection, it should be noted that the wave subjected to amplitude modulation is supplied through an attenuator (not shown) to the outer input terminal of the hybrid circuit 33c. The hybrid circuit is made up of a 90° phase lag circuit. When, as shown in FIG. 14, a signal having an amplitude A is applied to one of the input terminals of the hybrid circuit 33c while a signal having an amplitude B is applied to the other input terminal, a signal having an amplitude $A/2 + B2$ is provided at one of the output termials of the hybrid circuit and a signal having an amplitude $A/2 - B2$ is provided at the other output terminal.

FIG. 15 shows calculational examples of the horizontal directivity pattern of the roadside antenna thus constructed.

Figure 15A:
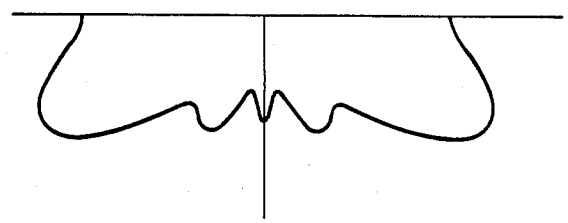
FIG. 15 is a diagram showing calculated values for a radiation pattern of the roadside antenna shown in FIG. 13.

In the case of FIG. 15(a), signals equal in phase to one another are applied to the dipole antennas 31a and 31b, with the level of the signals applied to the dipole antennas 31b held 10 dB lower than that of the signals supplied to the dipole antennas 31a. The resulting directivity pattern is substantially flat over a wide range.

Figure 15B:
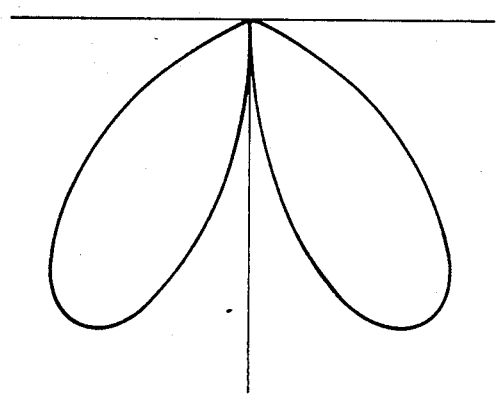

In the case of FIG. 15(b), signals which are equal in level but opposite in phase are supplied to the dipole antennas 31b only. The directivity pattern is sharp in two directions which form a relatively small angle, with the field strength decreased abruptly at the center.

Figure 15C:
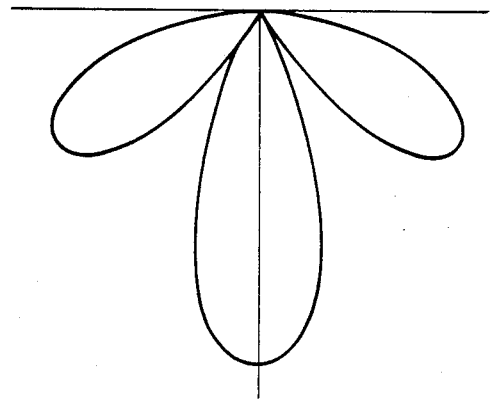

In the case of FIG. 15(c), signals which are equal both in level and in phase are applied to the dipole antennas 31b only. The directivity pattern is sharp in three directions. That is, for the vehicle traveling along the road, the roadside antenna exhibits high directivity especially at the center.

Accordingly, when a modulation wave signal of constant amplitude is radiated according to the directivity shown in FIG. 15(a) and a modulation wave signal subjected to amplitude modulation is radiated according to the directivity shown in FIG. 15(b) or 15(c), a number of data blocks can be transferred to the navigation device, and the position of the vehicle can be accurately determined without the suspension of the data transmission.

Figure 16:
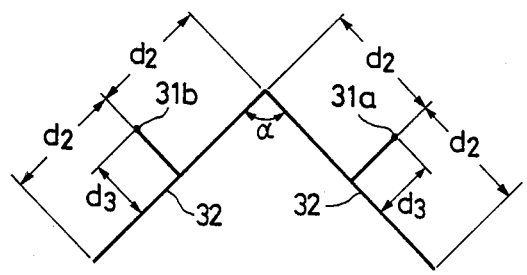
FIG. 16 is a schematic view showing still another example of the roadside antenna.

FIG. 16 schematically shows still another example of the roadside antenna. The roadside antenna of FIG. 16 is different from those described above only in the following points: Only two dipole antennas are employed, that is, the right half of the antenna of FIG. 13 is employed alone and is turned horizontally through 45° in installation. The modulation wave signal of constant amplitude and the modulation wave signal subjected to amplitude modulation are applied to these two dipole antennas through the hybrid circuit.

Figure 17A:
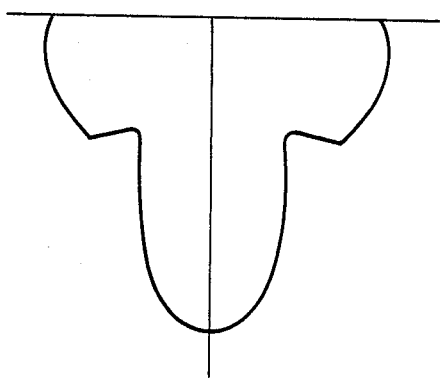
FIG. 17 is a diagram showing calculated values for a radiation pattern of the roadside antenna shown in FIG. 16.

Therefore, when signals which are equal both in level and in phase to each other are applied to the dipole antennas, the directivity pattern is as shown in FIG. 17(a); that is, a relatively wide lobe is extended in one direction at the center, and two lobes having some electric field strength are formed on both sides of it.

Figure 17B:
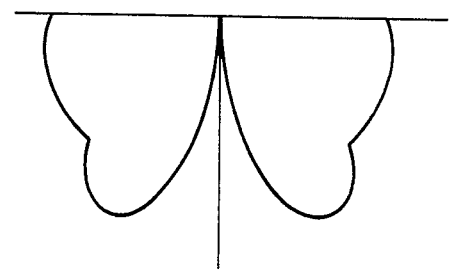

When signals which are equal in level but opposite in phase are applied to the dipole antennas, the pattern is as shown in FIG. 17(b); that is, two sharp lobes are extended in two directions which form a relatively small angle, and the electric field strength falls abruptly at the center.

Accordingly, when a signal of constant amplitude is radiated according to the directivity shown in FIG. 17(a) and a signal subjected to amplitude modulation is radiated according to the directivity shown in FIG. 17(b), a number of data blocks can be transferred to the navigation device, and the position of the vehicle can be accurately determined without the suspension of data transmission.

As has been described above, according to this invention, a modulation wave signal for data transmission which has been modulated with a constant amplitude is radiated from a roadside antenna so that it reaches a somewhat remote position, while an amplitude-modulated wave signal for position detection and decision is radiated so that it ranges only in the vicinity of the roadside antenna, and the mobile device which is loaded on the vehicle is arranged to perform a position decision by amplitude-detecting the wave which has been subjected to amplitude modulation and to calibrate its positional data on the basis of the position decision signal and the received data. Accordingly, it is possible to reliably prevent the suspension of data transmission at a position which directly confronts the roadside antenna. In addition, it is possible to maintain the position detecting accuracy at a high level, and the quantity of transmission data can be increased.

What is claimed is:

1. A roadside beacon system in which a roadside antenna installed at a predetermined position in a road traffic network transmits data to a vehicle and receives data from a vehicle, comprising;

means for transmitting from said roadside antenna a first signal of constant amplitude, said first signal being modulated according to transmission data, and a second signal amplitude-modulated with a predetermined frequency, and navigator means located on said vehicle for receiving signals transmitted from said roadside antenna, said navigator means including means for detecting said second signal to perform position detection and to output a position decision signal, and means for calibrating at least position data stored in said navigator means in response to said position decision signal and in accordance with data received via said first signal.

2. A roadside beacon system according to claim 1, further comprising means for generating a carrier wave signal of a predetermined frequency, means for dividing said carrier signal into two parts, means for subjecting one of said signal parts to modulation at a constant amplitude according to transmission data and for then transmitting said signal from said roadside antenna via said transmitting means, and means for subjecting the other of said signal parts to amplitude modulation with a predetermined frequency and for then transmitting said signal from said roadside antenna via said transmitting means.

3. A roadside beacon system according to claim 1, further comprising means for generating a carrier wave signal of a predetermined frequency, means for subjecting said carrier signal to modulation at a constant amplitude according to transmission data, means for dividing said modulated signal into two parts, and for forwarding one of said parts to said transmitting means, and means for subjecting the other of said parts to amplitude modulation with a predetermined frequency, and for then forwarding said other part to said transmitting means.

4. A roadside beacon system according to claim 1, wherein said transmitting means comprises a first antenna for said first signal and a second antenna for said second signal.

5. A roadside beacon system according to claim 1, wherein said transmitting means comprises a common antenna for transmitting both of said first and second signals.

6. A roadside beacon system according to claim 1, wherein said transmitting means comprises means for transmitting said second signal from said roadside antenna in a beam pattern having high directivity.

7. A roadside beacon system according to claim 1, wherein said transmitting means comprises means for transmitting said second signal from said roadside antenna in the form of a split beam.

8. A roadside beacon system according to any one of claims 1 to 7, wherein said transmitting means comprises means for transmitting said first and second signals in a manner such that said second signal is transmitted from said roadside antenna in such a manner that said signal has weaker electric field strength than that of said first signal.

9. A system as claimed in claim 1, which comprises limiter means provided in a received-data transmitting path, for eliminating amplitude variation components.

10. A roadside beacon system in which a roadside antenna installed at a predetermined position in a road traffic network transmits data to a vehicle comprising;
a plurality of antenna units arranged laterally;
means for generating a first signal modulated with a constant amplitude according to transmission data, and means for supplying said first signal to said antenna units so that the directivity of said roadside antenna exhibits electric field strengths higher than a predetermined value over a predetermined range;
means for generating a second signal amplitude-modulated with a predetermined frequency, and means for supplying said second signal to said antenna units so that the directivity of said roadside antenna exhibits a sharp lobe pattern, and
navigation means on said vehicle for receiving signals from said roadside antenna, comprising:
position decision means for detecting said second signal and for generating a position decision signal; and
calibrating means for calibrating at least said position data in response to said position decision signal and in accordance with said transmission data.

11. A system as claimed in claim 10, wherein said first signal generating means comprises phase shift modulation means, and said second signal generating means comprises amplitude modulation means for modulating said signal with a frequency much higher than that of an amplitude variation due to fading.

12. A system as claimed in claim 10, wherein said roadside antenna comprises four antenna units, said first signal being applied to all of said antenna units with a predetermined phase, and said second signal being applied to two central ones of said four antenna units in such a manner that said second signal as applied to one of said two central antenna units is substantially opposite in phase to said second signal as applied to the other.

13. A system as claimed in claim 10, wherein said roadside antenna comprises four antenna units, said first signal being applied to all of said four antenna units with a predetermined phase, and said second signal being applied to two central ones of said four antenna units in a substantially in-phase manner.

14. A system as claimed in claim 12, wherein said four antenna units comprise:
two first antenna units disposed substantially in parallel with a road of said road traffic network; and
two second antenna units disposed on either side of said two first antenna units in such a manner that said second antenna units are arranged at angles with respect to said first antenna units.

15. A system as claimed in claim 12, in which said first signal as applied to said two central antenna units is lower in signal strength than that as applied to the remaining antenna units.

16. A system as claimed in claim 10, wherein said roadside antenna comprises two antenna units, said first signal being applied to said two antenna units in a manner such that said first signal as applied to one of said antenna units is substantially in phase with said first signal as applied to the other said unit, and said second signal being applied to said two antenna units in such a manner that said second signal as applied to one of said two antenna units is opposite in phase to said second signal as applied to the other said unit.

17. A system as claimed in claim 13, wherein said four antenna units comprise:
two first antenna units disposed substantially in parallel with a road of said road traffic network; and
two second antenna units disposed on either side of said two first antenna units in such a manner that said second antenna units are arranged at angles with respect to said first antenna units.

18. A system as claimed in claim 13, in which said first signal as applied to said two central antenna units is lower in signal strength than that as applied to the remaining antenna units.

* * * * *